United States Patent [19]

Yamada et al.

[11] Patent Number: 4,937,572
[45] Date of Patent: Jun. 26, 1990

[54] MAP DISPLAY APPARATUS STORING DATA OF PHYSICALLY ADJACENT MAP SECTIONS IN PHYSICALLY ADJACENT STORAGE LOCATIONS

[75] Inventors: Takeshi Yamada, Seto; Tomoyasu Fujii, Kariya; Norihisa Fujii, Toyoake; Kenzo Ito, Okazaki, all of Japan

[73] Assignee: Nippondenso Co., Ltd., Kariya, Japan

[21] Appl. No.: 231,642

[22] Filed: Aug. 9, 1988

Related U.S. Application Data

[63] Continuation of Ser. No. 158,050, Feb. 16, 1988, abandoned, which is a continuation of Ser. No. 856,159, Apr. 25, 1986, abandoned.

[30] Foreign Application Priority Data

Apr. 27, 1985 [JP] Japan .................................. 60-93054

[51] Int. Cl.$^5$ ................................. G08G 1/12
[52] U.S. Cl. ........................... 340/995; 340/990; 364/449
[58] Field of Search ............ 340/988, 990, 995; 364/424, 444, 449, 460; 73/178 R; 353/12; 358/108

[56] References Cited

U.S. PATENT DOCUMENTS

| | | | |
|---|---|---|---|
| 4,240,108 | 12/1980 | Levy | 358/103 |
| 4,400,727 | 8/1983 | Aron | 340/995 |
| 4,504,913 | 3/1985 | Miura et al. | 340/995 |
| 4,511,973 | 4/1985 | Miura et al. | 340/995 |
| 4,513,377 | 4/1985 | Hasebe et al. | 340/995 |
| 4,514,810 | 4/1985 | Ito et al. | 340/995 |
| 4,532,514 | 7/1985 | Hatano et al. | 340/995 |
| 4,550,317 | 10/1985 | Moriyama et al. | 340/995 |
| 4,571,684 | 2/1986 | Takanabe et al. | 340/995 |
| 4,602,251 | 7/1986 | Sawada et al. | 340/995 |
| 4,630,065 | 12/1986 | Ichikawa | 340/995 |
| 4,660,037 | 4/1987 | Nakamura | 340/990 |
| 4,737,927 | 4/1988 | Hanabusa et al. | 340/990 |
| 4,744,033 | 5/1988 | Ogawa et al. | 340/990 |

OTHER PUBLICATIONS

Japanese Abstract of 58-75020, Fujinami, 05-06-83.

*Primary Examiner*—Joseph A. Orsino
*Assistant Examiner*—Brent A. Swarthout
*Attorney, Agent, or Firm*—Cushman, Darby & Cushman

[57] ABSTRACT

A map display apparatus displays a map of a desired district in accordance with stored map data. The apparatus includes a recording medium storing map data of a map to be displayed in a manner that the whole area of the map is divided into a plurality of districts and the map data are successively stored starting from the nearest district, a display district selecting device for selecting the desired map district to be displayed, a control unit for reading the map data of the selected district from the recording medium and generating a control signal for displaying the thus read map data, and a display responsive to the control signal to display the map of the selected district. The map data of each district includes duplicate map data of the boundary parts of the adjoining districts. Map data of adjacent districts are stored in adjacent memory locations. Thus, the map data of the desired district can be displayed quickly.

4 Claims, 8 Drawing Sheets

MAP DISPLAY APPARATUS STORING DATA OF PHYSICALLY ADJACENT MAP SECTIONS IN PHYSICALLY ADJACENT STORAGE LOCATIONS

This is a continuation of application Ser. No. 07/158,050, filed Feb. 16, 1988, which was abandoned upon the filing hereof and which in turn was a continuation of Ser. No. 06/856,159, filed Apr. 25, 1986, now abandoned.

BACKGROUND OF THE INVENTION

1. Field of the Invention

The present invention relates to map display systems and more particularly to map display systems so designed that a display is made by reading the desired map data from a recording medium preliminarily storing the map data of a whole area to be displayed.

2. Description of the Prior Art

Various map display apparatuses of the type employing a CRT or the like to display a road map, for example, have been proposed in the past. One such apparatus is designed so that the map data of a whole area to be displayed is preliminarily recorded in a map data recording medium including a magnetic tape, magnetic disc, CD ROM or the like, and the map data of the desired display district is read from the map data recording medium thereby displaying the desired map or district information on a CRT.

With this type of map display apparatus, it has been common to have the map data of a whole area to be displayed divided into a given number of sections and stored as such in a map data recording medium whereby the desired map data (section information) of the section to be displayed is extracted from the stored data and displayed on a CRT. Thus, there is a disadvantage that since the divided section information are simply recorded in order from the north to the south (or from the east to the west), even the sections adjoining on the map are separately located on the map data recording medium. Thus, when displaying the map on the CRT or changing the displayed map, it is necessary to sequentially search the map data recording medium from the beginning and extract the desired section information thus requiring a considerable amount of time to read the map data.

SUMMARY OF THE INVENTION

It is an object of the present invention to provide map display apparatus and method in which the map data of sections adjoining on a map are also adjacently recorded on a map data recording medium and thus the desired map data is extracted in a short period of time.

To accomplish the above object, in accordance with the invention there is thus provided apparatus and method in which a map display apparatus includes display means for displaying a map, a map data recording medium in which the map data of a whole area to be displayed on the display means is successively recorded in the form of a plurality of section information corresponding to the plurality of sections of the whole area, display division selecting means selects a map division to be displayed on the display means, and map display control means reads from the map data recording medium the section information belonging to the division selected by the display division selecting means and displaying a map on the display means, whereby the section information is recorded in correspondence to a plurality of districts such that the adjoining section information are arranged adjacently.

The display means displays a map and it may be a CRT, liquid crystal dot-display, LED display or the like. The display division selecting means selects a map to be displayed on the display means and it may be designed so that when the map display apparatus is installed in a vehicle, during the driving of the vehicle its position changing from instant to instant is detected so that when the vehicle moves away from a given area of the presently displayed map, the map of a division lying in the direction of the vehicle movement is selected. Alternatively, map selecting operating means for the vehicle driver may be provided so that the vehicle driver selects a map to be displayed and it is also possible to continuously move the map through the operation of the vehicle driver.

The map data recording medium stores the map data of a whole area to be displayed in the form of a plurality of section information each corresponding to one of a plurality of predetermined sections and it may be a magnetic tape, magnetic disc or CD ROM. Then, the map data recording medium stores the section information in correspondence to a plurality of districts such that the adjoining section information are arranged adjacently thereby making it possible to extract the desired map data more quickly than previously.

The map display control means mainly comprises a microcomputer including a CPU, an ROM, an RAM, etc., so that the section information of the division selected by the display division selecting means are read out and the map of the division is displayed on the display means.

In accordance with the map display apparatus of the invention constructed as described above, the map data of the division selected by the display division selecting means is read from the map data recording medium and the map of this division is displayed on the display means. Then, in accordance with the invention the section information in the map data recording medium are recorded in correspondence to the predetermined districts such that the adjoing section information is arranged adjacently with the result that the section information belonging to each division to be displayed are arranged adjacent to each other in the map data recording medium and thus the extraction of the map data of the division is performed in a short period of time.

DESCRIPTION OF THE PREFERRED EMBODIMENTS

An embodiment of the invention will now be described with reference to the drawings.

Figure 3:
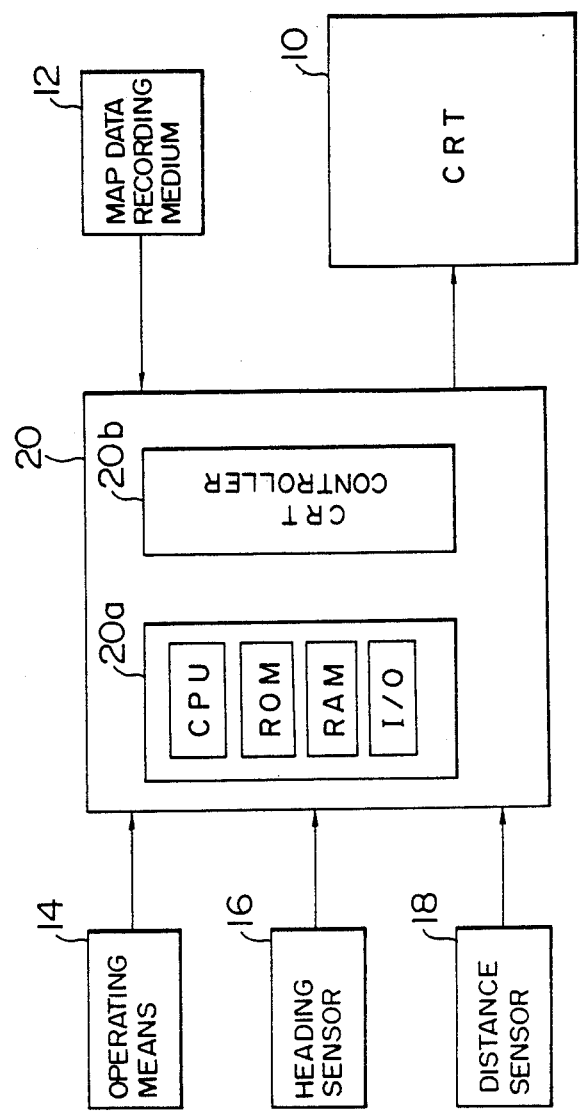
FIG. 3 is a block diagram showing the overall construction of a map display apparatus according to an embodiment of the invention.

FIG. 3 is a block diagram showing the overall construction of a map display apparatus for vehicles according to an embodiment of the invention.

In the Figure, numeral 10 designates a CRT for displaying a map, 12 a map data recording medium in which are preliminarily recorded map data to be displayed on the CRT 10, 14 operating means used by the vehicle occupant, e.g., the driver to select various information to be displayed on the CRT 10, 16 a heading sensor for detecting the heading or the direction of movement of the vehicle in which the map display apparatus is installed, 18 a distance sensor for detecting the distance traveled by the vehicle, and 20 a control unit responsive to the signals from the operating means 14, the heading sensor 16 and the distance sensor 18 to display various map information on the CRT 10.

Figure 1:
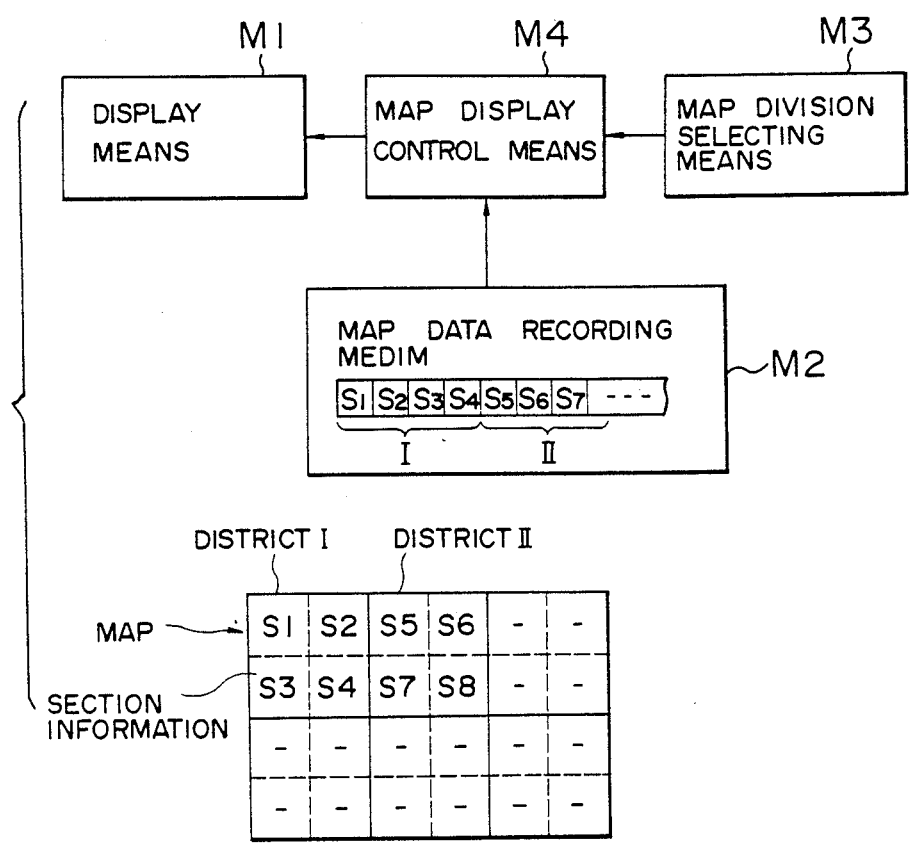
FIG. 1 is a block diagram for explaining the construction of the invention.
Figure 2:
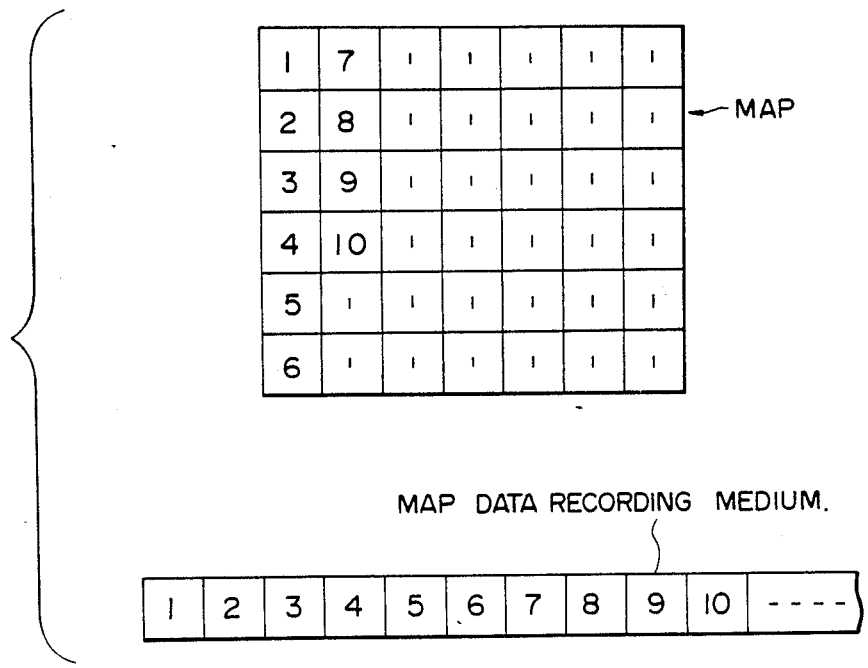
FIG. 2 is a diagram for explaining a conventional map data recording medium.

The operating means 14, the heading sensor 16 and the distance sensor 18 correspond to the display division selecting means M3 of FIG. 1, and the operating means 14 includes a plurality of operating keys for selecting the reduced scale of a map to be displayed and the names of various districts or spots to be displayed on the map. The heading sensor 16 is composed of a ring-shaped permalloy core, an exciting coil and two coils wound to cross at right angles to detect the direction of movement of the vehicle relative to the earth's magnetic field in accordance with the output voltages of the two coils and the distance sensor 18 includes a reed switch, magnetoresistance element, photoelectric conversion element or the like to detect the rotation of the speedometer cable or the transmission output shaft as an electric signal.

The map data recording medium 12 forms the principal part of the invention and in this embodiment it includes a CD ROM in which the map of the whole area to be displayed is divided into small parts according to predetermined conditions and the resulting hierarchy map data are recorded in succession.

Figure 4:
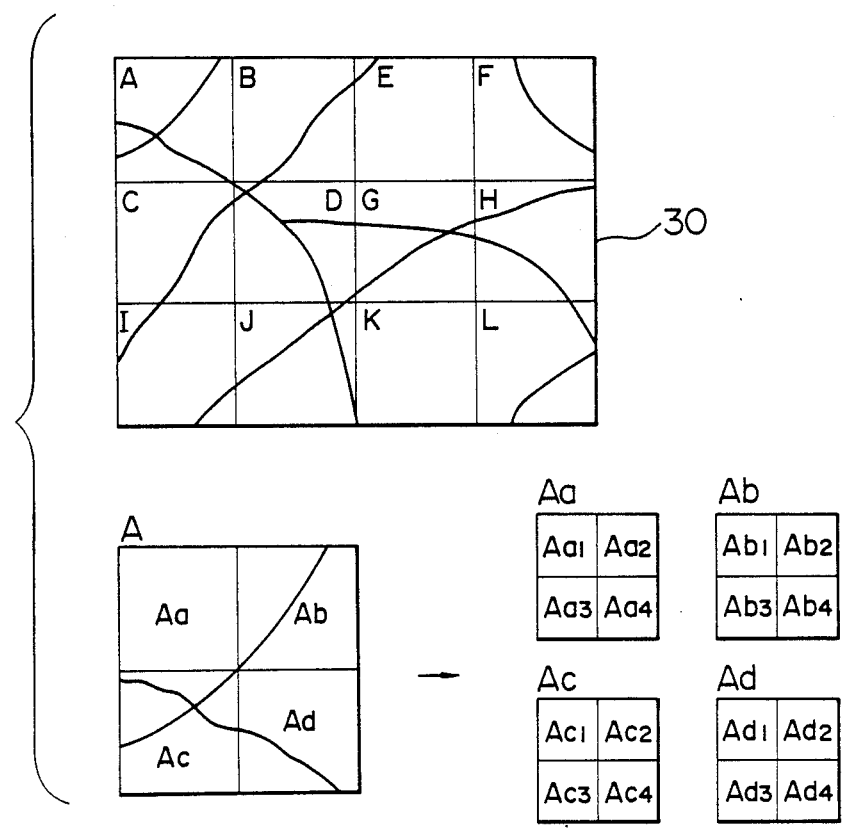
FIG. 4 illustrates diagrams for explaining the construction of map data.

More specifically, as shown in FIG. 4, a map 30 of the whole area to be displayed on the CRT is divided into given districts A, B, C,—which are each in turn divided into four sections a, b, c and d. Each of the sections a, b, c and d is further divided into four subsections. Thus, the map data is recorded in the form of subsection information Aa1, Aa2,—which are successively arranged on the basis of the sections and the districts, respectively.

Figure 5:
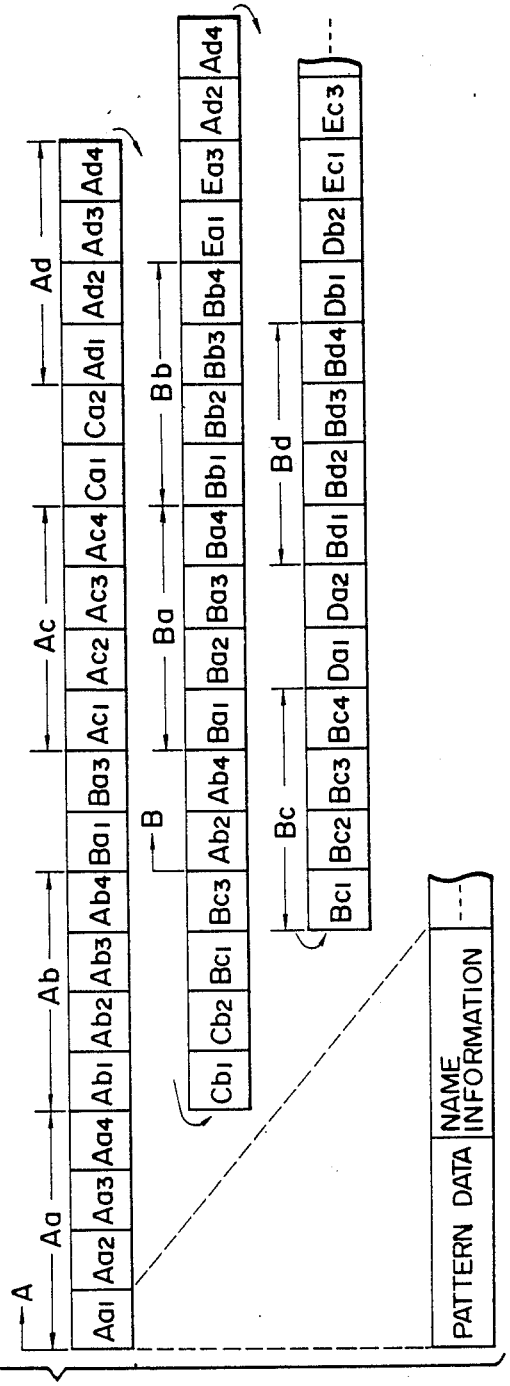
FIG. 5 is a diagram for explaining the construction of the map data recording medium in which the map data of FIG. 4 is recorded.

FIG. 5 shows the arrangement of the map data of the subsections in the districts A and B recorded in the map data recording medium 12. As shown in the Figure, the subsection information Aa1 Aa2,—are recorded successively in correspondence to the sections Aa, Ab,—and the districts A, B,—and also the subsection information of the adjoining districts, e.g., the information Ca1, Ca2,—are jointly recorded in the map data of the districts A, B,—. The subsection information Aa1, Aa2,—include the map information of the corresponding sections so that as shown in the Figure each map information include pattern data showing the configuration of a map such as roads, rivers, railways and administrative boundaries and name information including for example the names of various parts on the map.

The control unit 20 corresponds to the map display control means of FIG. 1 and it includes a microcomputer 20a including a CPU, an ROM, an RAM, I/O ports, etc., and a CRT controller 20b for displaying the map information on the CRT 10. The control unit 20 performs a series of map display processing steps so that the present position of the vehicle is detected in accordance with the output signals from the heading sensor 16 and the distance sensor 18 and the map data of the division corresponding to the detected vehicle position and the reduced scale selected by the occupant through the operation of the operating means 14 is read from the map data recording medium 12 and displayed on the CRT, while effecting the display of various name information by the selection of the occupant.

Figure 6:
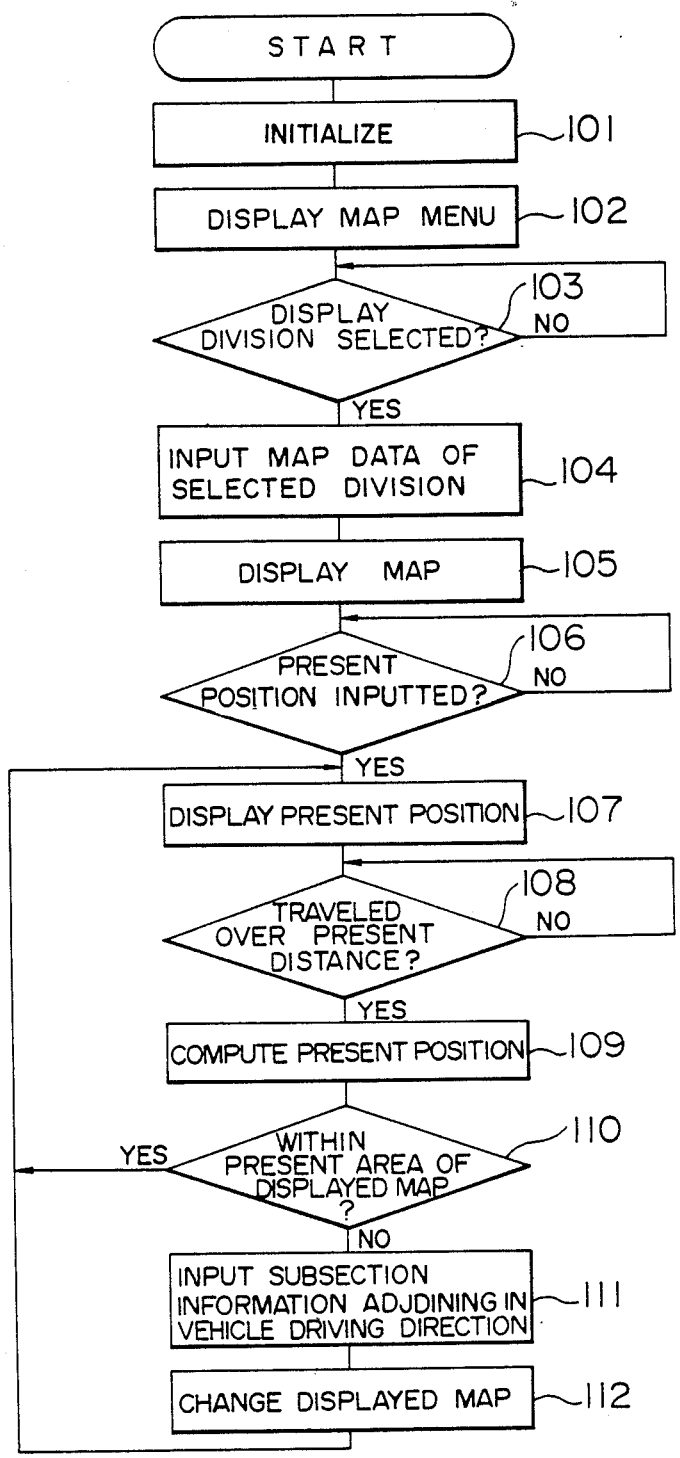
FIG. 6 is a flow chart showing the map display processing performed by the control unit.
Figure 7:
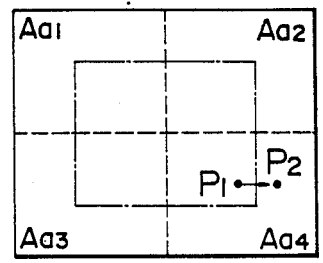
FIGS. 7 and 8 are picture data diagrams for explaining changes in the map picture displayed on the CRT by the map display processing.

FIG. 6 is a flow chart showing the map display processing performed by the control unit 20.

As shown in the Figure, after the processing has been started, an initialization is performed at a step 101 and a transfer is made to a step 102. At the step 102, the menu of the map data is displayed on the CRT 10 to allow the driver to select the desired map division to be displayed. Then, at the step 103, it is determined whether the desired map display division has been selected. If it is, a transfer is made to a step 104.

At the step 104, the map data of the selected division is read from the map data recording medium 12 and a transfer is made to a step 105. At the step 105, the CRT controller 20b is operated in accordance with the read map data and the map is displayed on the CRT 10.

Then, at a step 106, it is determined whether the position of the vehicle on the map displayed on the CRT 10 has been entered by the occupant. If it is, a transfer is made to a step 107 so that the present position is displayed on the CRT 10.

At a step 108, whether the vehicle has traveled more than a predetermined distance from the vehicle position displayed presently on the CRT 10 is determined in accordance with the distance signal generated from the distance sensor 18. If it is determined that the vehicle has traveled in excess of the predetermined distance, a transfer is made to the next step 109 where the present position of the vehicle is computed in accordance with the heading signal generated from the heading sensor 16 during the movement of the vehicle and a transfer is made to a step 110.

At the step 110, it is determined whether the thus determined present position of the vehicle is within a specified area on the displayed map. If it is, a return is made to the step 107. On the contrary, if the present position of the vehicle is otuside the specified area of the map displayed presently on the CRT 10, a transfer is made to a step 111 thereby inputting the information of the subsections adjoining the map of the presently displayed division in the direction of movement of the vehicle. Then, a transfer is made to the next step 112 where the displayed map is changed in accordance with a combination of the inputted subsection information and the presently displayed map data and then a return is made to the step 107.

Figure 8:
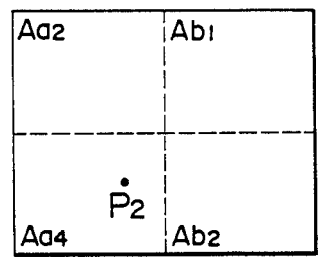
Figure 9:
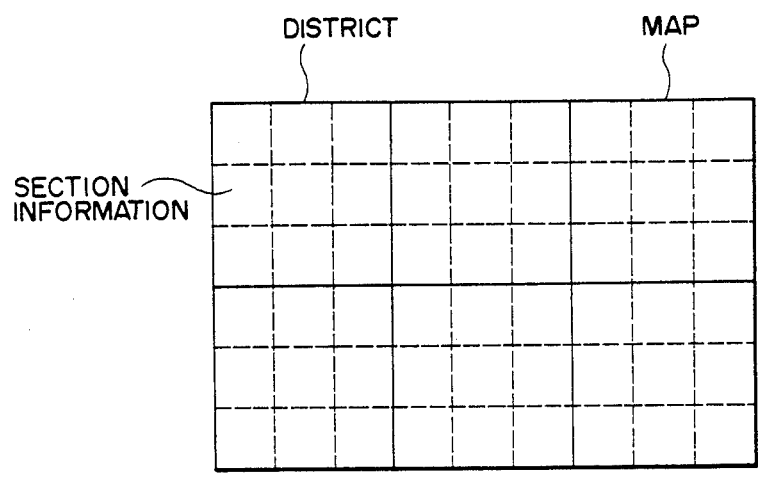
FIG. 9 is a diagram showing an example of the construction of map data different from that used in the embodiment.

With the vehicle map display apparatus of the embodiment constructed as described above, if the division of the presently displayed map is the section Aa of FIG. 4, for example, and if the vehicle moves from a spot P1 to a spot P2 on the CRT 10 thus moving away from the area shown by the dot-and-dash line, at the step 111, the adjoing subsection information in the driving direction, i.e., the information Ab1 and Ab2 are inputted and the displayed map is changed as shown in FIG. 8.

In the case of the conventional vehicle map display apparatus, however, the subsection information are simply recorded in sequential order in the map data recording medium 12 and therefore the subsection information in the map data recording medium 12 must be searched from the entire range of the map data of the medium 12 in order to input the corresponding subsection information. In accordance with the present embodiment, the information of the adjoining subsections on the map are recorded adjacently in the map data recording medium 12 so that it is only necessary to search the neighborhood of the subsection information which are being displayed and the extraction of the information can be effected more quickly than previously.

When the presently displayed map of the section scale is reduced to the district scale thereby displaying a larger-scale map on the CRT 10, the surrounding map data are present in the vicinity of the subsection information of the presently displayed division and thus the extraction of the desired subsection information to be displayed can be effected more quickly than previously.

Further, in accordance with this invention, not only the subsection information are successively recorded in correspondence to the adjoining sections and the adjoining districts as well but also the map data of each district includes the subsection information of the other adjoining districts in a duplicative manner. Thus, when changing the displayed map in response to the movement of the vehicle, the desired subsection information can be extracted more rapidly, although the amount of information is increased. In other words, when the vehicle enters for example into the district B from the district A thus requiring first the subsection information of the district B adjoining the district A, the required subsection information are contained in the map data of the district A and therefore the information can be quickly extracted to change the displayed map. Thereafter, it is only necessary to fast forward the map data recording medium 12 to reach the area containing the map data of the district B.

While, in this embodiment, the data structure of the map data recording medium 12 takes the form of a three-level hierarchy structure in which each of a plurality of district information includes four section information and each of the section information includes four subsection information, it is possible to use any other hierarchy structure of multiple levels such as a two-level hierarchy structure comprising a plurality of district information each including nine section information and in this case the same effect can be obtained only if the map data of the smallest unit divisions (e.g., the section information) in the map data recording medium 12 are recorded in correspondence to the districts and the adjoining sections. In this case, it is also possible to effect the extraction of map data more quickly than previously by recording the section information of the adjoining districts in duplication for each district, it is possible to extract the desired map data more quickly than previously.

Further, while in the embodiment, each of the subsection information Aa1, Aa2,—includes map configuration indicative pattern data and name information representing the names of various points on the map, it is also possible to arrange the system so that as for example, each of the subsection information Aa1, Aa2 includes only a map configuration indicative pattern, and so that name information is recorded in the form of a name information string separately from the map data.

From the foregoing description it will be seen that in accordance with the map display apparatus of the invention, by virtue of the fact that map data (section data) divided in correspondence to a plurality of sections and that the adjoining section information are also arranged adjacently, there is an effect that the map data of the sections adjoining on a map are also located adjacently in the map data recording medium thus making it possible to extract the map data of the division to be displayed on the display means more quickly than previously.

We claim:

1. A map display apparatus for displaying a map in accordance with stored data comprising:
   map data recording means for storing map data indicative of said map to be displayed, a whole area of said map being divided into a plurality of districts, said map data recording means storing map data representing each of said districts in a successive, one-dimensional sequence at map data storage locations, wherein each of said plurality of districts is further subdivided into a plurality of sections, said map data recording means recording said plurality of sections such that map data representing each of said sections are successively stored in sequence and map data of physically adjacent districts are stored in physically adjacent memory locations even where adjacent sections are from different districts, and said map data recording means also storing an adjoining portion map data which represents a portion of at least one adjoining district to said each district said adjoining portion map data being indicative of same information as a portion of map data representing said adjoining district which is stored in a map data storage location for said adjoining district and being different from said map data storage location of said each district;
   indicating means for indicating a predetermined area of said map to be displayed;
   map display control means for:
   (1) determining if said predetermined area indicated by said indicating means is entirely included within one of said plurality of districts, and one dimensionally reading out map data from a plurality of said sections of said one of said plurality of districts from said map data recording means if so to retrieve said data indicating said plurality of sections as display data for said one district, and
   (2) determining when said predetermined area indicated by said indicating means extends from one of said districts into an adjacent district thereto, and one dimensionally reading out map data for (a) said one of said districts and (b) said adjoining portion map data for a portion of said adjacent district from a map data storage location for said adjoining district to said one district to retrieve said map data for a first portion of said one district and for a second portion of said adjacent district as display data; and
   display means responsive to said display data from said map display control means for combining said map data indicating said sections included in said display data to display a map of said indicated area based thereon.

2. A map display apparatus for displaying a map in accordance with stored data comprising:

map data recording means for storing map data indicative of said map to be displayed, a whole area of said map being divided into a plurality of districts, said map data recording means storing map data representing each of said districts in a successive, one-dimensional sequence at map data storage locations, wherein each of said plurality of districts is divided into a plurality of sections, each of said plurality of sections being further subdivided into a plurality of subsections, and wherein said map data recording medium records map data representing each of said subsections successively in sequence such that map data from adjoining subsections are recorded in adjoining memory locations even where adjacent subsections belong to different sections, and said map data recording means also storing an adjoining portion map data which represents a portion of at least one adjoining district to said each district said adjoining portion map data being indicative of same information as a portion of map data representing said adjoining district which is stored in a map data storage location for said adjoining district and being different from said map data storage location of said each district;

indicating means for indicating a predetermined area of said map to be displayed;

map display control means for:

(1) determining if said predetermined area indicated by said indicating means is entirely included within one of said plurality of districts, and one dimensionally reading out map data from a plurality of said sections of said one of said plurality of districts from said map data recording means if so to retrieve said data indicating said plurality of sections as display data for said one district, and (2) determining when said predetermined area indicated by said indicating means extends from one of said districts into an adjacent district thereto, and one dimensionally reading out map data for (a) said one of said districts and (b) said adjoining portion map data for a portion of said adjacent district from a map data storage location for said adjoining district to said one district to retrieve said map data for a first portion of said one district and for a second portion of said adjacent district as display data; and display means responsive to said display data from said map display control means for combining said map data indicating said sections included in said display data to display a map of said indicated area based thereon.

3. A method for displaying a map in accordance with stored data, comprising the steps of:

successively storing map data in a one dimensional sequence representing each of a plurality of districts and each of a plurality of positions within said each district by defining a map data storage location for each said portion in which to store map data representing said each portion a map data for each district including a portion of at least one physically adjoining district to said each district said map data in said map data storage location representing said portion of each said physically adjoining district being indicative of same information as map data representing said portion of each physically adjoining district which is stored in a map data storage location for said each physically adjoining district which is different from said map data storage location of said each of said districts;

wherein the step of recording map data includes the step of dividing each of said plurality of districts into a plurality of sections such that map data representing each of said sections are successively stored in sequence starting from adjoining sections adjacent to one of said sections and map data of physically adjacent districts are stored in physically adjacent memory locations even where adjacent sections belong to different district;

indicating a predetermined area in said map to be displayed;

first determining when said predetermined area indicated by said indicating step is included in one of said plurality of districts one-dimensionally reading out map data of said one of said plurality of districts to display said indicated area based on read-out data, when said first determining step is positive;

second determining when said predetermined area indicated by said indicating means extends from one of said districts to an adjacent district;

one-dimensionally reading out the map data of at least one portion of said one of said districts and map data of a portion of said adjacent district to display said predetermined area by combining both said map data of said at least one portion of said one of districts and said map data of said portion of said adjacent district when said second determining step is positive; and displaying a map responsive to a combination of said read out map data.

4. A method for displaying a map in accordance with stored data, comprising the steps of:

successively storing map data in a one dimensional sequence representing each of a plurality of districts and each of a plurality of positions within said each district by defining a map data storage location for each said portion in which to store map data representing said each portion a map data for each district including a portion of at least one physically adjoining district to said each district said map data in said map data storage location representing said portion of each said physically adjoining district being indicative of same information as map data representing said portion of each physically adjoining district which is stored in a map data storage location for said each physically adjoining district which is different from said map data storage location of said each of said districts;

wherein said step of recording map data includes the step of dividing each of said plurality of districts into a plurality of sections, and further dividing each of said plurality of sections into a plurality of subsections, map data representing each of said subsections being successively stored in sequence starting from adjoining subsections adjacent to one of said subsections and map data of physically adjacent districts are stored in physically adjacent memory locations even were adjacent subsections belong to different sections indicating a predetermined area in said map to be displayed;

first determining when said predetermined area indicated by said indicating step is included in one of said plurality of districts one-dimensionally reading out map data or said one of said plurality of districts to display said indicated area based on read-out data, when said first determining step is positive;

second determining when said predetermined area indicated by said indicating means extends from one of said districts to an adjacent district;

one-dimensionally reading out the map data of at least one portion of said one of said districts and map data of a portion of said adjacent district to display said predetermined area by combining both said map data of said at least one portion of said one of districts and said map data of said portion of said adjacent district when said second determining step is positive; and displaying a map responsive to a combination of said read out map data.

* * * * *